(12) United States Patent
Ibatullin et al.

(10) Patent No.: US 9,497,163 B2
(45) Date of Patent: *Nov. 15, 2016

(54) IDENTIFYING MALICIOUS DEVICES WITHIN A COMPUTER NETWORK

(71) Applicant: Juniper Networks, Inc., Sunnyvale, CA (US)

(72) Inventors: Oskar Ibatullin, Sunnyvale, CA (US); Kyle Adams, West Henrietta, NY (US); Daniel J. Quinlan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,884

(22) Filed: Dec. 30, 2015

(65) Prior Publication Data

US 2016/0119286 A1    Apr. 28, 2016

Related U.S. Application Data

(63) Continuation of application No. 14/689,255, filed on Apr. 17, 2015, now Pat. No. 9,258,328, which is a (Continued)

(51) Int. Cl.
*H04L 29/06* (2006.01)
*G06F 21/55* (2013.01)
*H04L 29/08* (2006.01)

(52) U.S. Cl.
CPC ......... *H04L 63/0209* (2013.01); *G06F 21/554* (2013.01); *H04L 63/1425* (2013.01);
(Continued)

(58) Field of Classification Search
CPC combination set(s) only.
See application file for complete search history.

(56) References Cited

U.S. PATENT DOCUMENTS 7,526,806 B2    4/2009  Wiley et al.
9,015,839 B2    4/2015  Ibatullin et al.
(Continued)

OTHER PUBLICATIONS

"Enterprise Web Fraud," ThreatMetrix—Cybercrime Prevention, 2013, available at http://www.threatmetrix.com/solutions/enterprise-web-fraud/, accessed on May 31, 2013, 2 pp.
(Continued)

*Primary Examiner* — Beemnet Dada
(74) *Attorney, Agent, or Firm* — Shumaker & Sieffert, P.A.

(57) ABSTRACT

This disclosure describes techniques for proactively identifying possible attackers based on a profile of a device. For example, a device includes one or more processors and network interface cards to receive, from a remote device, network traffic directed to one or more computing devices protected by the device, determine, based on content of the network traffic, a first set of data points for the device, send a response to the remote device to ascertain a second set of data points for the device, and receive, from the remote device, at least a portion of the second set of data points. The device also includes a security module operable by the processors to determine a maliciousness rating, and selectively manage, based on the maliciousness rating, additional network traffic directed to the one or more computing devices protected by the security device and received from the remote device.

20 Claims, 5 Drawing Sheets

Related U.S. Application Data continuation of application No. 14/014,537, filed on Aug. 30, 2013, now Pat. No. 9,015,839.

(52) U.S. Cl.
CPC ....... *H04L 63/1441* (2013.01); *H04L 63/1466* (2013.01); *H04L 67/10* (2013.01)

(56) References Cited

U.S. PATENT DOCUMENTS

| | | |
|---|---|---|
| 2005/0021649 A1 | 1/2005 | Goodman et al. |
| 2006/0107321 A1 | 5/2006 | Tzadikario |
| 2008/0077793 A1 | 3/2008 | Tan et al. |
| 2009/0064334 A1 | 3/2009 | Holcomb |
| 2009/0265777 A1 | 10/2009 | Scott |
| 2010/0030891 A1 | 2/2010 | Kim et al. |
| 2010/0305990 A1 | 12/2010 | Tyree et al. |
| 2011/0016525 A1 | 1/2011 | Jeong et al. |
| 2011/0047620 A1 | 2/2011 | Mahaffey et al. |
| 2011/0067108 A1 | 3/2011 | Hoglund |
| 2011/0138470 A1 | 6/2011 | Davis et al. |
| 2011/0191849 A1 | 8/2011 | Jayaraman et al. |
| 2012/0023572 A1 | 1/2012 | Williams, Jr. et al. |
| 2012/0210421 A1 | 8/2012 | Ormazabal et al. |
| 2013/0247195 A1 | 9/2013 | Takahashi et al. |
| 2013/0254889 A1 | 9/2013 | Stuntebeck |
| 2014/0283061 A1 | 9/2014 | Quinlan et al. |
| 2015/0222661 A1 | 8/2015 | Ibatullin et al. |

OTHER PUBLICATIONS

Eckersley, Peter "A Primer on Information Theory and Privacy", Electronic Frontier Foundation, Jan. 26, 2010, available at https://www.eff.org/deeplinks/2010/01/primer-information-theory-and-privacy, accessed May 31, 2013, 4 pgs.

Extended European Search Report from counterpart European Application No. 14182605.7, dated Feb. 6, 2015, 8 pp.

Holm et al, "Empirical analysis of system-level vulnerability metrics through actual attack," IEEE transactions on dependable and secure computing, Dec. 2012,14 pp.

IDENTIFYING MALICIOUS DEVICES WITHIN A COMPUTER NETWORK

This application is a continuation of U.S. patent application Ser. No. 14/689,255 filed Apr. 17, 2015, which is a continuation of U.S. patent application Ser. No. 14/014,537 filed Aug. 30, 2013, now U.S. Pat. No. 9,015,839, the entire contents of both of which are incorporated herein by reference.

TECHNICAL FIELD

This disclosure relates to computing systems and, more specifically, computing system attack detection and prevention.

BACKGROUND

There is an increasing volume and sophistication of cyber attacks, particularly those aimed at web applications and servers, which deal in high-value traffic. Insecure applications and servers can lead to customer loss, financial loss, damaged reputation and legal conflicts. In an attempt to detect cyber attacks from a group of attackers, for example, a company may use attack signatures. However, attack signatures are reactive in that they only block attacks that trigger an existing signature and, in some instances, after some damage has already been done by the attacker. Moreover, attackers may alter the network traffic such that the attacker's traffic no longer matches the signature, thereby defeating the signature and preventing the security devices from blocking the attack.

SUMMARY

In general, this disclosure describes techniques for proactively identifying possible attackers. In some example implementations, the techniques identify a possible attacker by constructing a profile that includes a combination of device environment information gathered from the potentially attacking device and header data (e.g., hypertext transmission protocol (HTTP) header data) extracted from communications received from the device. For example, techniques of this disclosure may enable a security service to compare device environmental information gathered by the security service with respect to an operating environment of the device to header data in communications received from the device. In the event the security service identifies inconsistencies between the environmental information and the header data, the security service may determine that the device is a malicious device associated with an attacker. Further, the security service may analyze the environmental information and header data to identify plugins, applications, or other characteristics of the device to determine if any of the device characteristics are indicative of a malicious device. In examples where the device is determined to be a malicious device, a security device may manage the network traffic originating from the malicious device.

The security service may be implemented locally, at the security device, or in a cloud computing system. By implementing the security service in a cloud computing system, the security service may use a global database to aggregate information about attacker devices from a number of different companies to provide a consolidation point for attacker and threat information. The security service may then propagate the learned attacker device information to other security devices in the network. In this manner, a global database of attacker device characteristics may be generated and distributed across security devices such that the security devices can identify and mitigate attacks initiated by attacker devices, even if the attacker devices had never before attacked resources protected by the particular security device.

In one example, a method includes receiving, by a security device and from a device, network traffic directed to one or more computing devices protected by the security device, determining, based on content of the network traffic, a first set of data points for the device, the first set of data points including characteristics of a software application executing at the device, and sending, by the security device, a response to the device to ascertain a second set of data points for the device, the second set of data points including characteristics of an operating environment provided by and local to the device. The method may also include, receiving, by the security device and from the device, at least a portion of the second set of data points, determining, based on the received portion of the second set of data points and the first set of data points, a maliciousness rating, and selectively managing, based on the maliciousness rating, additional network traffic directed to the one or more computing devices protected by the security device and received from the device.

In another example, a device includes one or more processors, one or more network interface cards, and a security module. The one or more network interface cards receive, from a remote device, network traffic directed to one or more computing devices protected by the device, determine, based on content of the network traffic, a first set of data points for the device, the first set of data points including characteristics of a software application executing at the remote device, send a response to the remote device to ascertain a second set of data points for the remote device, the second set of data points including characteristics of an operating environment provided by and local to the remote device, and receive, from the remote device, at least a portion of the second set of data points. The security module is operable by the one or more processors to determine, based on the received portion of the second set of data points and the first set of data points, a maliciousness rating, and selectively manage, based on the maliciousness rating, additional network traffic directed to the one or more computing devices protected by the security device and received from the remote device.

In another example, a computer-readable storage medium is encoded with instructions. The instructions cause one or more programmable processors to receive, from a device, network traffic directed to one or more computing devices protected by the security device, determine, based on content of the network traffic, a first set of data points for the device, the first set of data points including characteristics of a software application executing at the device, and send a response to the device to ascertain a second set of data points for the device, the second set of data points including characteristics of an operating environment provided by and local to the device. The instructions further cause the one or more programmable processors to receive, from the device, at least a portion of the second set of data points, determine, based on the received portion of the second set of data points and the first set of data points, a maliciousness rating, and selectively manage, based on the maliciousness rating, additional network traffic directed to the one or more computing devices protected by the security device and received from the device.

The details of one or more embodiments are set forth in the accompanying drawings and the description below.

Other features, objects, and advantages will be apparent from the description and drawings, and from the claims.

DETAILED DESCRIPTION

Figure 1:
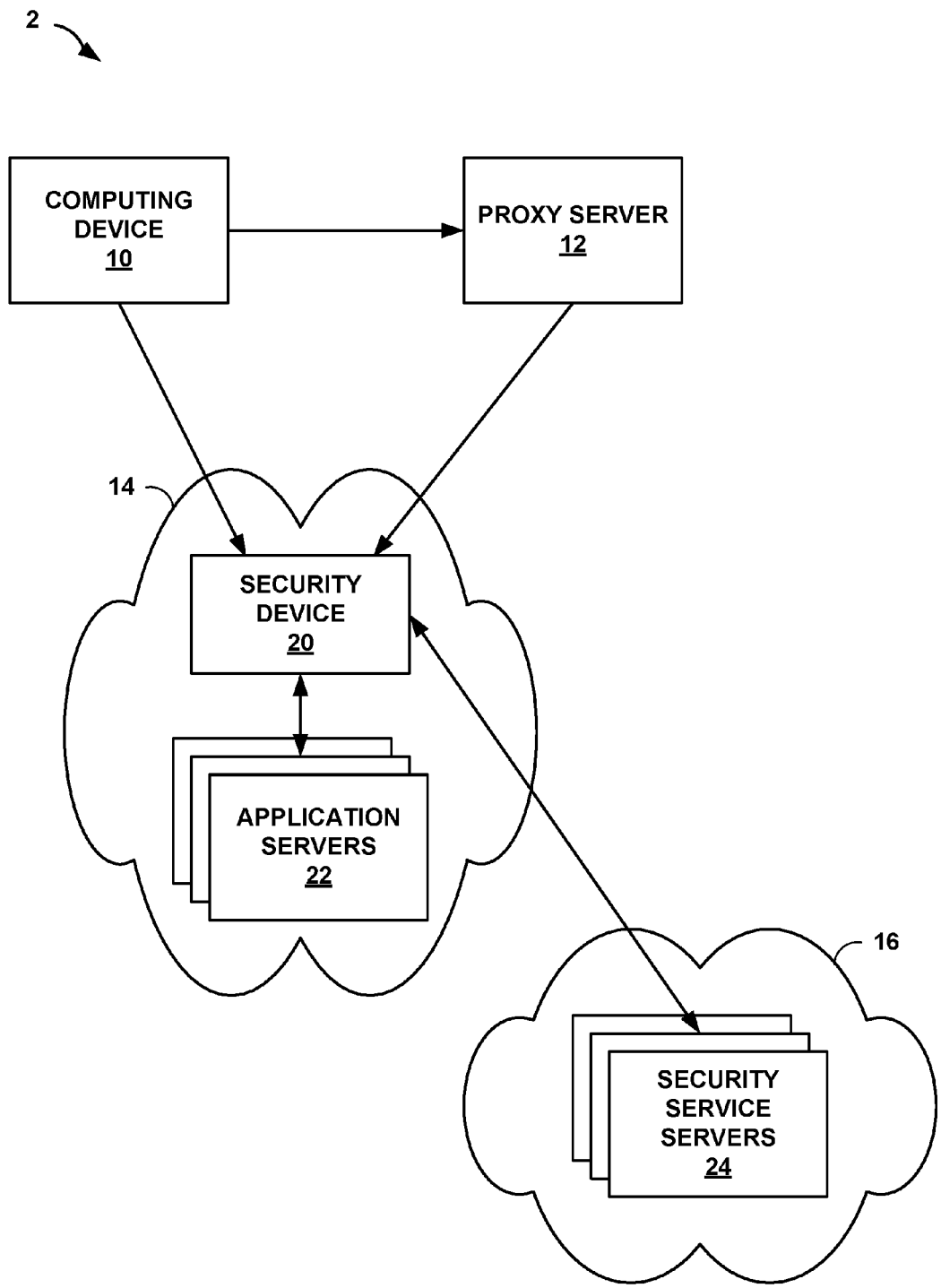
FIG. 1 is a block diagram illustrating an example malicious device identification network system, in accordance with one or more aspects of the present disclosure.

FIG. 1 is a block diagram illustrating an example malicious device identification network system 2, in accordance with one or more aspects of the present disclosure. As shown in FIG. 1, network system 2 includes computing device 10, proxy server 12, target network 14, and security service 16. Computing device 10 is one example of a computing device that may be used to attack the network resources of a target network or data center. In some examples, computing device 10 is a mobile, laptop, desktop, or server computing system or may include multiple computing devices. For instance, computing device 10 may be a group of computing devices over which an attacker has control (e.g., because the attacker previously hijacked those computing devices). In some examples, computing device 10 is virtual machine or a software application (e.g., web browser, attacker tool, script, etc.) that is executed by one or more computing devices.

Computing device 10 may attempt to connect to target network 14 directly or through a proxy server, such as proxy server 12. Proxy server 12 may obfuscate the IP address associated with computing device 10 by, for example, making the network traffic generated by computing device 10 appear as if the network traffic is originating at proxy server 12. By obfuscating the IP address of computing device 10, typical security appliances may allow the attacking network traffic into the target network because the attacking network traffic no longer matches the rules previously configured to block network traffic from computing device 10. In contrast, security device 20, configured in accordance with techniques of this disclosure, may continue to block network traffic from computing device 10, even if computing device 10 utilizes proxy server 12 for the network attack.

Target network 14 may include one or more servers for providing web applications, such as application servers 22, as well as security devices, such as security device 20. Target network 14 may include additional network devices, such as firewall, routers, switches, service nodes, etc. (not shown). Application servers 22 are examples of web application servers that provide web applications for users. In some examples, application servers 22 may be configured as a cluster, as a distributed computing system, or as other redundant and/or load balanced configurations. Security device 20 is a network device configured to protect application servers 22 from attacking devices by, for example, identifying and managing network communications received from devices identified as malicious devices (e.g., computing device 10).

While described herein as determining whether computing device 10 is a "malicious device," techniques of this disclosure may identify whether one or more software applications executing at computing device 10 are maliciousness software applications. As one example, computing device 10 may execute a programmatic script that probes target network 14 for potential security vulnerabilities. As another example, computing device 10 may execute a software application provide web crawler functionality. In both of these examples, security device 20 and security service 16 may identify the particular software application executing at computing device 10 as being malicious or benign. As described herein, determining that a device is a "malicious device" includes determining that one or more software applications executing at the device is a malicious software application. Thus, the term "malicious device" includes "malicious software application" and determining whether a device is a malicious device includes determining whether a software application executing at the device is a malicious software application.

In one example, computing device 10 sends a request for content to application servers 22. The request for content may be sent directly to target network 14 or routed through proxy server 12. A request sent directly to target network 14 refers to a request sent without going through a proxy server (e.g., proxy server 12), but the request may travel through intermediate network devices, such as routers, gateways, firewalls, etc. and/or through intermediate networks and still be considered as being sent directly to target network 14, in the sense that they are not being sent through a proxy server. In some instances, computing device 10 may send some requests directly to target network 14 as well as sending other requests through proxy server 12 to target network 14.

Security device 20 is configured to protect application servers 22 and is positioned, in the network path, between computing device 10 and application servers 22. Security device 20 receives the request previously sent by computing device 10 and initiates a profile building process. The term "profile" refers to the combination of a number of data points (e.g., characteristics) about computing device 10 that can be captured by the security device when the computing device attempts to access a target network by, for example, requesting access to a web application, initiating a virtual private network (VPN) session, initiating a secure shell connection, etc. In general, a profile generated for a particular device may include data points (e.g., characteristics associated with computing device 10) relating to a number of attributes associated with an operating environment provided by and local to the computing device, such as User Agent, HTTP_ACCEPT headers, browser plugin details, time zone of the device, screen size and color depth of a monitor of the device, installed system fonts, operating system version information, and whether or not cookies are enabled. In some examples, the profile also includes a data point relating to the IP address of the device.

In one example, in order to generate a profile of computing device 10, security device 20 may initially allow the request from computing device 10 to be sent to application servers 22. In response to determining that one or more of application servers 22 have sent a response message to the request, security device 20 may intercept the response message and inject executable code (e.g., a script, Java code, or the like) into the intercepted response message for execution within the operating environment of computing device 10. The injected code functions to ascertain data points, such as configuration information, when executed on computing device 10. In another example, security device 20 intercepts the initial request from computing device 10 and sends a response to computing device 10 without allowing the request from computing device 10 to reach application servers 22. In this example, security device 20 may generate fake information to include in the response, as well as the executable code that ascertains configuration information of computing device 10. In either example, computing device 10 receives the response to the request and, upon executing the injected code, sends at least a portion of the data points requested by security device 20.

Security device 20 may alternatively or additionally analyze and collect information from the request sent by computing device 10 (e.g., without injecting code or otherwise requesting specific information from computing device 10). Security device 20 may also include the information collected from the request in a profile security device 20 generates for computing device 10. Security device 20 generates a profile from all of the collected information by, for example, collecting a list of all of the distinct values for each data point such that the profile includes a list of values for each particular data point (rather than just a single value for data points for which multiple values were received). In some examples, security device 20 applies a hash function to each data point to anonymize the data points such that the data points do not include any personal information but may still be used to generate a profile for a device. If security device 20 is unable to collect values for one or more of the requested data points (e.g., because computing device 10 does not include the values in a response), security device 20 does not include those values in the profile. Thus, different profiles for different devices may include different sets of data points (e.g., characteristics).

In some examples, security device 20 compares different data points of the generated profile to each other to identify inconsistencies within the profile. In one example, the profile includes at least two data points corresponding to an operating system version executing at computing device 10. The data points corresponding to the operating system version may include information provided by computing device 10 (e.g., header information) and may include information collected by security device 20 (e.g., in response to a code injection). Security device 20 may compare the operating system version information provided each of the two different ways to determine if they are inconsistent. For example, the operating system version information provided in the header information may specify one operating system while the information collected by security device 20 in response to the injected code may specify a different operating system.

Security device 20 may also compare operating system version information to installed plugin information to identify inconsistencies. In one example, the header information provided by computing device 10 indicates that a particular plugin is installed at computing device 10. However, the operating system version information provided to security device 20 in response to the injected code indicates that computing device 10 is executing an operating system that is incompatible with the plugin.

In general, inconsistencies in the device profile are determined to correspond to an increased likelihood that the device (e.g., computing device 10) is a malicious device. Accordingly, in instances where security device 20 identifies one or more inconsistencies in the generated profile, security device 20 may increase the maliciousness rating for computing device 10. While described as being increased, the maliciousness rating may be adjusted in any manner such that security device 20 and/or security service 16 are configured to correlate the adjusted maliciousness rating to an increased likelihood that computing device 10 is a malicious device.

Security device 20 may also adjust a maliciousness rating for computing device 10 based on identified plugins and other software applications installed at computing device 10 as well as a type of connection computing device 10 is using to connect to target network 14. Based on the identified plugins, software applications, and connection type, security device 20 may adjust the maliciousness rating. For example, if an anti-virus software application is installed at computing device 10, security device 20 may decrease or otherwise adjust the maliciousness rating for computing device 10 to indicate a decreased likelihood that computing device 10 is a malicious device. As another example, if security device 20 determines that computing device 10 is connecting to target network 14 using a virtual private network (VPN) connection, security device 20 may decrease the maliciousness rating for computing device 10. In another example, security device 20 may determine that an anonymization plugin is installed at computing device 10 and, in response, increase the maliciousness rating of computing device 10.

Instead of, or in addition, to performing a local maliciousness determination process, security device 20 may identify computing device 10 as a malicious device by, for example, sending the generated device profile to a security service (e.g., security service 16). Security device 20 may send additional information to security service 16, such as an identifier of security device 20 and an indication of whether the local maliciousness determination process indicated that computing device 10 is a likely malicious device.

Security service 16 may include a plurality of security service servers 24, which may be configured to provide security services. For example, security service servers 24 may be configured as a cluster or distributed computing system within a cloud data center that manages a global device fingerprint database. Security service servers 24 receive device profile information from security device 20 and analyze the profile to determine whether the profile is indicative of a malicious device. As described with respect to security device 20, security service 16 may increase the maliciousness rating for a particular device in response to identifying inconsistencies in the device profile information.

Responsive to analyzing the device profile information and generating a maliciousness rating, security service 16 may send an indication as to whether computing device 10 is likely a malicious device to security device 20. The indication may include the generating maliciousness rating and/or an indication of whether security server 16 categorized computing device 10 as a malicious device. In either instance, security device 20 may determine whether computing device 10 is a malicious device based on the information received from security server 16. Security device 20 may also determine whether computing device 10 is a malicious device based on a local analysis of the device profile information, described above, or based on a combination of the local analysis and the information received from security service 16.

If security device 20 determines that computing device 10 is a malicious device, security device 20 may manage the network traffic received from computing device 10 by, for example, initiating countermeasures to inhibit the ability of computing device 10 to attack target network 14 and application servers 22. The countermeasures may include sending fake information, dropping network packets received from computing device 10, slowing down the network connection, removing potentially harmful user input values, redirecting the network packets, or otherwise preventing network packets sent from computing device 10 from reaching protected resources (e.g., application servers 22) of target network 14.

Figure 2:
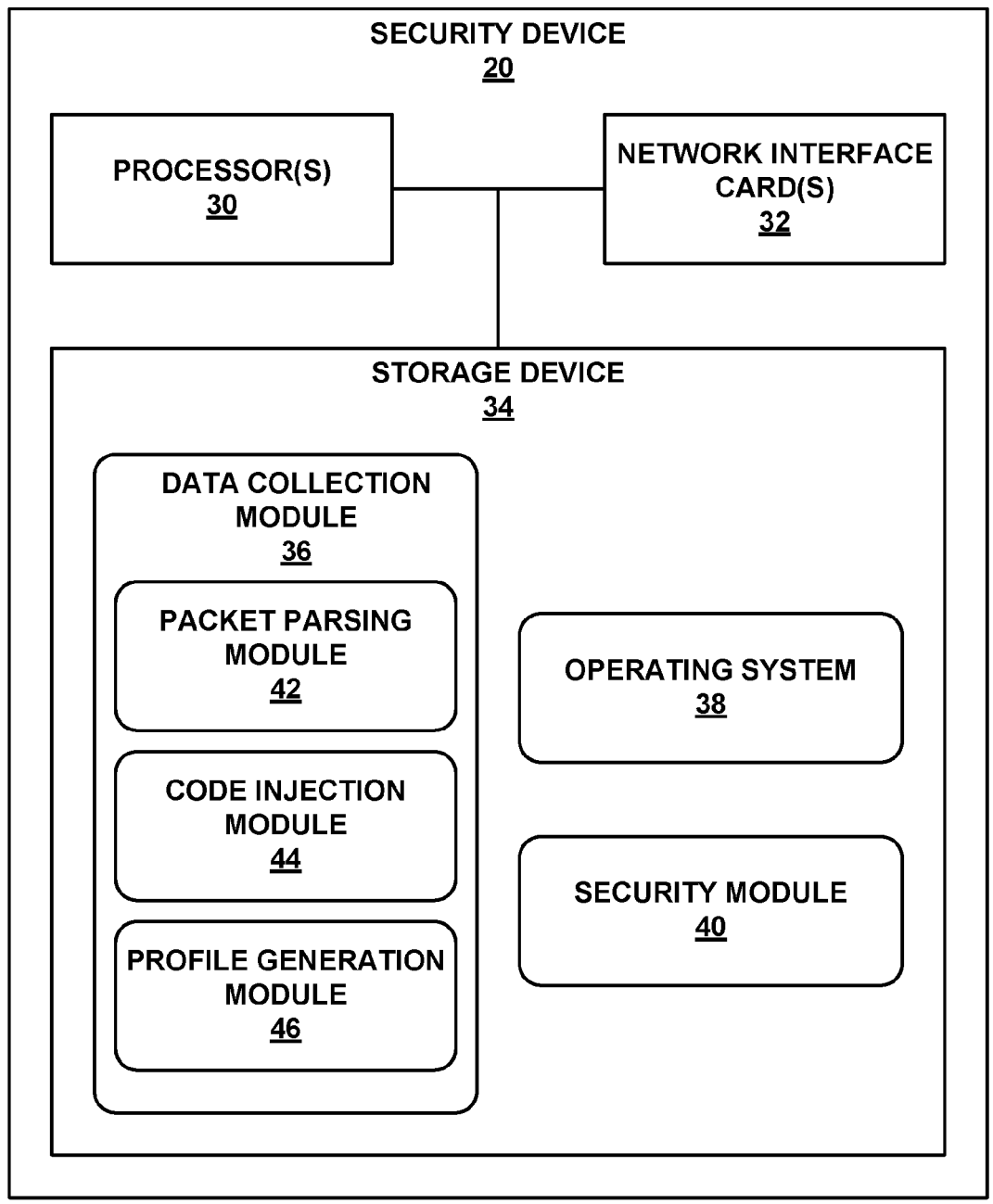
FIG. 2 is a block diagram illustrating an example security device for identifying malicious devices, in accordance with one or more aspects of the present disclosure.

FIG. 2 is a block diagram illustrating an example security device for identifying malicious devices, in accordance with one or more aspects of the present disclosure. FIG. 2 illustrates only one particular example of security device 20, and many other examples of security device 20 may be used in other instances. For purposes of illustration only, security device 20 is described below in the context of network system 2 of FIG. 1.

As shown in the specific example of FIG. 2, security device 20 may provide an execution environment for executable software instructions. In this example, security device 20 includes one or more processors 30, one or more network interface cards 32, and one or more storage devices 34. Each of components 30, 32, and 34 may be interconnected (physically, communicatively, and/or operatively) by one or more communication channel(s) for inter-component communications. In some examples, the communication channel(s) may include one or more system buses, network connections, inter-process communication data structures, or other channels for communicating data.

Processor(s) 30, in some examples, are configured to implement functionality and/or execute instructions. For example, processor(s) 30 may be capable of processing instructions stored in storage device(s) 34. Examples of processor(s) 30 may include, one or more of a microprocessor, a controller, a digital signal processor (DSP), an application-specific integrated circuit (ASIC), a field-programmable gate array (FPGA), or other type of discrete or integrated logic circuitry.

Storage device(s) 34 may be configured to store program code and/or data for use within security device 20. In the example of FIG. 2, storage device(s) 34 may store software components including data collection module 36, operating system 38, and security module 40. Storage device(s) 34, in some examples, are described as computer-readable storage media. In some examples, storage device(s) 34 include temporary memory, meaning that primary purposes of storage devices 34 are not long-term storage. Storage device(s) 34, in some examples, include volatile memory, meaning that storage device(s) 34 do not maintain stored contents when security device 20 is turned off. Examples of volatile memories may include random access memories (RAM), dynamic random access memories (DRAM), static random access memories (SRAM), and other forms of volatile memories known in the art. In some examples, storage device(s) 34 are used to store program instructions for execution by processor(s) 30. Storage device(s) 34, in some examples, are used by programs or applications running on security device 20 to temporarily store information during program execution.

Storage device(s) 34, in some examples, comprise one or more computer-readable storage media. Storage device(s) 34 may be configured to store larger amounts of information than volatile memory. Storage device(s) 34 may further be configured for long-term storage of information. In some examples, storage device(s) 34 include non-volatile storage elements. Examples of such non-volatile storage elements include magnetic hard discs, optical discs, floppy discs, flash memories, or forms of electrically programmable memories (EPROM) or electrically-erasable and programmable (EEPROM) memories.

Security device 20 may use network interface card(s) 32 to communicate with external devices via one or more communication networks, such as one or more wireless networks. Network interface card(s) 32 may include one or more Ethernet cards, optical transceivers, radio frequency transceivers, or other types of devices that are configured to send and receive information. Other examples of network interfaces may include Bluetooth radios, 3G radios, and WiFi radios, as well as Universal Serial Bus (USB) interfaces. In some examples, security device 20 may use network interface card(s) 32 to wirelessly communicate with another device that is operably coupled to security device 20.

Operating system 38 may control the operation of components of security device 20. For example, operating system 38 may facilitate communication between data collection module 36, processors 30, network interface cards 32, and storage devices 34. One or more components of storage devices 34, including operating system 38, data collection module 36, and security module 40 may each include program instructions and/or data that may be executable by security device 20. Data collection module 36 and security module 40 may include instructions that cause security device 20 to perform one or more of the operations and actions described in the present disclosure. In some examples, one or more of the components illustrated in storage device(s) 34 may be implemented in hardware and/or a combination of software and hardware.

In accordance with the techniques of this disclosure, security device 20 receives network traffic from computing device 10, such as a request for information relating to a web application executing at application servers 22. The network traffic may be received via one of network interface cards 32. The network traffic is directed to data collection module 36 for processing. Data collection module 36, as shown in FIG. 2, includes packet parsing module 42, code injection module 44, and profile generation module 46. Responsive to data collection module 36 receiving the request, packet parsing module 42 parses the request to extract information, such as User Agent information, included in the network traffic and that can be used, in combination with other data points, to determine whether computing device 10 is a malicious device. The extracted information may include characteristics of computing device 10. The extracted information may be provided to profile generation module 46 for use in generating a device profile for computing device 10.

In some examples, the network traffic is passed along to one of application servers 22 (FIG. 1) and application servers 22 generate a response to the network traffic. The response is sent from application servers 22 and is directed to computing device 10 (e.g., having a destination address associated with computing device 10). However, before the response leaves target network 14, security device 20 may intercept the response and may alter the response. For example, code injection module 44 may insert code into the response in order to cause computing device 10 to provide configuration and other information about computing device 10. Code injection module 44 may dynamically generate the code based on the type of request and response exchanged. For example, if the network traffic originates from a web browser, code injection module 44 may insert code that is executable by a web browser such that when the response is received by computing device 10 and displayed within the web browser, the web browser automatically executes the code and the information about computing device 10 is sent to security device 20. As another example, if the network traffic originated from a different application, a script, etc., code injection module 44 injects the appropriate type of code into the response. In general, code injection module 44 is configured to inject code into the response such that the code is executed by computing device 10 and the resulting information returned to security device 20 without requiring a user of computing device 10 to perform any additional actions.

In other examples, security module 40 generates and sends false responses to computing device 10 such that the request is not forwarded to application servers 22. Instead, security module 40 acts as if it were one of applications servers 22 and exchanges packets with computing device 10 in an attempt to collect additional information about computing device 10, without opening up application servers 22 to a possible attack. The responses sent by security module 40 may include code injected into the response by code injection module 44, as described above.

As additional network traffic is received by security device 20, any additional information that may be extracted from the requests is passed to profile generation module 46. Similarly, the configuration information and other information about computing device 10 received by security device 20 in response to the injected code being executed by computing device 10 is provided to profile generation module 46. Profile generation module 46 collects all of the different data items and associated data values. In some examples, each data item is associated with a different importance ranking such that those data items determined to be of higher importance are data items that are more likely to accurately identify computing device 10 as a malicious device while those data items determined to be of lower importance are less likely to accurately identify computing device 10 as a malicious device. Profile generation module 46 may refrain from generating a profile for computing device 10 until either the number of data items and corresponding data values for associated with computing device 10 satisfy a threshold number or the combined importance ranking satisfies a threshold total importance ranking. That is, profile generation module 46 may refrain from generating a profile for computing device 10 until profile generation module 46 has received enough information about computing device 10 to be able to identify computing device 10 as a malicious device with a threshold level of accuracy.

Once profile generation module 46 has received enough information about computing device 10 to generate a profile, profile generation module 46 generates a profile for computing device 10. In some examples, security device 20 determines whether computing device 10 is a malicious device by at least sending the generated profile to security service 16 and receiving an indication of a maliciousness rating and/or an indication of whether security service 16 categorized computing device 10 as a malicious device. In some examples, security device 20 determines whether computing device 10 is a malicious device by at least analyzing the generated device profile to identify one or more of malicious plugins installed at computing device 10, to identify one or more benign plugins installed at computing device 10, and to identify one or more inconsistencies between various data points of the generated profile. Security device 20 may generate a maliciousness rating based on the analysis of the device profile and compare the generated maliciousness rating to a threshold maliciousness rating to determine whether to categorize computing device 10 as a malicious device.

In additional to classifying computing device 10 based on the generated profile, security device 20 may monitor network traffic exchanged between computing device 10 and application servers 22 to determine if the network traffic is indicative of a malicious device. If so, security device 20 may determine that computing device 10 is a malicious device even though the generated profile may indicate otherwise. However, if the generated profile indicates that computing device 10 is associated with a malicious device, security device 20 treats the network traffic received from computing device 10 as through computing device 10 is a malicious device even though the network traffic associated with computing device 10 is not determined to be indicative of a malicious device.

In general, security device 20 selectively manages network traffic from computing device 10 based on whether computing device 10 is categorized as a malicious device. For example, if computing device 10 is determined to be a malicious device, security module 40 may manage network traffic received from computing device 10, such as by dropping packets received from computing device 10, sending computing device 10 fake information, requesting additional information about computing device 10 to create a more complete profile, or performing other actions to mitigate any attack attempted by computing device 10. If computing device 10 is determined not to be a malicious device, security device 20 may continue to allow network traffic to be exchanged between computing device 10 and application servers 22 without applying the various countermeasures described above.

Figure 3:
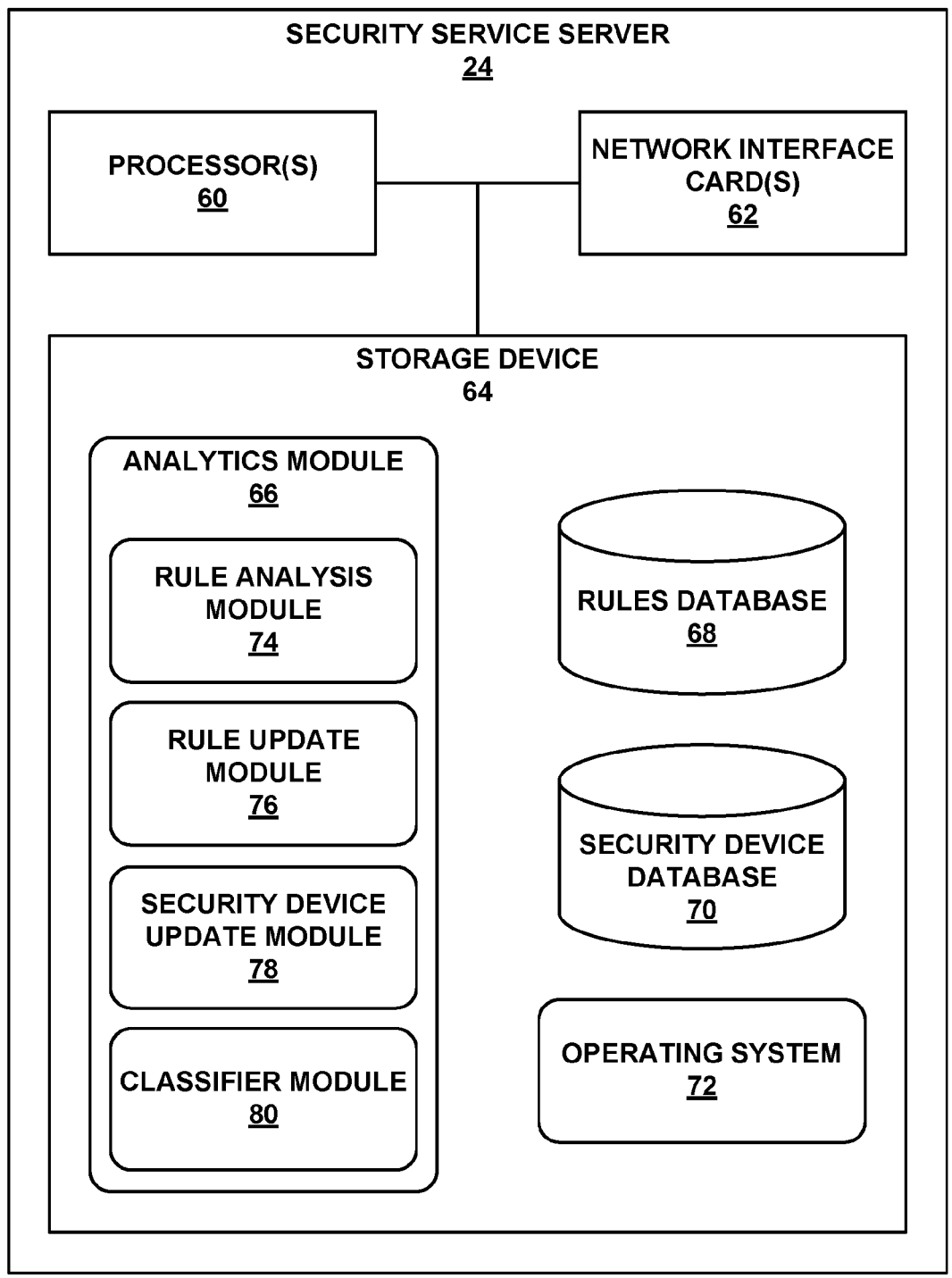
FIG. 3 is a block diagram illustrating an example security service server for consolidating malicious device information, in accordance with one or more aspects of the present disclosure.

FIG. 3 is a block diagram illustrating an example security service server for consolidating malicious device information, in accordance with one or more aspects of the present disclosure. FIG. 3 illustrates only one particular example of security service server 24, and many other examples of security service server 24 may be used in other instances. For purposes of illustration only, security service server 24 is described below in the context of network system 2 of FIG. 1.

As shown in the specific example of FIG. 3, security service server 24 may provide an execution environment for executable software instructions. In this example, security service server 24 includes one or more processors 60, one or more network interface cards 62, and one or more storage devices 64. Each of components 60, 62, and 64 may be interconnected (physically, communicatively, and/or operatively) by one or more communication channel(s) for inter-component communications. In some examples, the communication channel(s) may include one or more system buses, network connections, inter-process communication data structures, or other channels for communicating data.

Processor(s) 60, in some examples, are configured to implement functionality and/or execute instructions. For example, processor(s) 60 may be capable of processing instructions stored in storage device(s) 64. Examples of processor(s) 60 may include, one or more of a microprocessor, a controller, a digital signal processor (DSP), an application-specific integrated circuit (ASIC), a field-programmable gate array (FPGA), or other type of discrete or integrated logic circuitry.

Storage device(s) 64 may be configured to store program code and/or data for use within security service server 24. In the example of FIG. 3, storage device(s) 64 may store software components including analytics module 66, rules database 68, device profile database 70, and operating system 72. Storage device(s) 64, in some examples, are described as computer-readable storage media. In some examples, storage device(s) 64 include temporary memory, meaning that primary purposes of storage devices 64 are not long-term storage. Storage device(s) 64, in some examples, include volatile memory, meaning that storage device(s) 64 do not maintain stored contents when security service server 24 is turned off. Examples of volatile memories may include random access memories (RAM), dynamic random access memories (DRAM), static random access memories (SRAM), and other forms of volatile memories known in the art. In some examples, storage device(s) 64 are used to store program instructions for execution by processor(s) 60. Storage device(s) 64, in some examples, are used by programs or applications running on security service server 24 to temporarily store information during program execution.

Storage device(s) 64, in some examples, comprise one or more computer-readable storage media. Storage device(s) 64 may be configured to store larger amounts of information than volatile memory. Storage device(s) 64 may further be configured for long-term storage of information. In some examples, storage device(s) 64 include non-volatile storage elements. Examples of such non-volatile storage elements include magnetic hard discs, optical discs, floppy discs, flash memories, or forms of electrically programmable memories (EPROM) or electrically-erasable and programmable (EEPROM) memories.

Security service server 24 may use network interface card(s) 62 to communicate with external devices via one or more communication networks, such as one or more wireless networks. Network interface card(s) 62 may include one or more Ethernet cards, optical transceivers, radio frequency transceivers, or other types of devices that are configured to send and receive information. Other examples of network interfaces may include Bluetooth radios, 3G radios, and WiFi radios, as well as Universal Serial Bus (USB) interfaces. In some examples, security service server 24 may use network interface card(s) 62 to wirelessly communicate with another device that is operably coupled to security service server 24.

Operating system 72 may control the operation of components of security service server 24. For example, operating system 72 may facilitate communication between analytics module 66, rules database 68, device profile database 70, processors 60, network interface cards 62, and storage devices 64. One or more components of storage devices 64, including operating system 70, analytics module 66, rules database 68, and device profile database 70, may each include program instructions and/or data that may be executable by security service server 24. Analytics module 66, rules database 68 and device profile database 70 may each include instructions that cause security service server 24 to perform one or more of the operations and actions described in the present disclosure. In some examples, one or more of the components illustrated in storage device(s) 62 may be implemented in hardware and/or a combination of software and hardware.

In accordance with techniques of the present disclosure, security service server 24 receives device profile information for computing device 10. The device profile information may be a device profile generated by security device 20. For example, the device profile information may include at least a portion of data items collected by security device 20 based on an analysis of the network traffic received from computing device 10. The device profile information may also include one or more data points provided by computing device 10 in response to the injected code being executed by computing device 10.

The device profile information may be provided to analytics module 66 for analysis and determination of whether computing device 10 is a malicious device. As shown in FIG. 3, analytics module 66 includes rule analysis module 74, rule update module 76, security device update module 78, and classifier module 80. Rule analysis module 74 may retrieve one or more rules from rules database 68 to apply to the device profile information in order to generate a maliciousness rating for computing device 10. While described as a database, rules database 68 may be any data structure or combination of data structures, including hash tables, linked lists, etc. Typically, rules database 68 is configured to store information about one or more rules used to determine whether a device is a malicious device. In one example, the rules are logical constructs that may be applied to the device profile information to identify anomalies and to generate (e.g., calculate) a maliciousness rating for the particular device. In some examples, the rules may be defined by security professionals and may have characteristics that are similar to attack signatures. That is, the rules may be manually configured to identify certain anomalies (e.g., inconsistencies), identify certain installed plugins, identify whether any plugins are installed at all, etc. and, based on the identified characteristics of the particular device, calculate a maliciousness rating, which may be used to categorize the particular device as a malicious device.

In some examples, the rules may be generated using machine-learning techniques. For example, a learning data set that includes anomaly and plugin information may be provided to security service server 24. Analytics module 66 and rule update module 76 may process the learning data set to train and learn rules that may be stored in rules database 68. Rule update module 76 may use the learning data set to update rules already stored in rules database 68 and may generate additional rules based on the learning data set. Analytics module 66 may process multiple learning data sets over a period of time and may process other data (e.g., device profile information gathered from current network traffic received by security device 20) between processing learning data sets. If a security professional or other administrator manually changes the category for one or more devices (e.g., changing a device from being categorized as a malicious device to being categorized as not malicious), rule update module 76 may update the rules based on the manual categorization of the devices. Further, the rules generated using the machine learning techniques may be combined with rules generated by security professionals.

Rule analysis module 74 applies the rules to at least a portion of the device profile information. As one example, the device profile information includes User-Agent header information indicating that computing device 10 is a tablet computing device and browser plugin information indicating that an incompatible plugin is installed on computing device 10 and that computing device 10 supports file extensions that are not compatible with the tablet computing device operating system. The rules may identity the inconsistencies between the User-Agent header information and the plugin information, triggering an anomaly and result in an increased maliciousness rating (e.g., because the User-Agent header was likely falsified). As another example, if the rules identify certain browser extensions installed at the device that are proprietary and are likely to only be run by legitimate users on corporate-issued devices and/or identifies an anti-virus plugin or other plugins indicative of a benign user, combined with known HTTP headers, rule analysis module 74 decreases the maliciousness rating as the device is less likely to be a malicious device. Such browser extensions and plugins may be included in a whitelist of plugins and/or browser extensions.

As another example, computing device 10 may be executing an automated vulnerability scanner (e.g., as a script running without a browser) that is configured to output User-Agent information and other data points similar to those of a browser in an attempt to impersonate the browser and avoid detection by security systems. In this example, the device profile information, including the data points collected from the code injection, will likely indicate a complete absence of browser plugins or inconsistency between any included browser plugin information and the User-Agent information. Rule analysis module 74 will apply the rules and identify these anomalies and inconsistencies, which may result in a higher maliciousness rating.

As yet another example, computing device 10 may be executing a web search engine spider system (e.g., a web crawler software application). The device profile information may include known User-Agent information indicating that the network traffic is originating from a spider. However, in some instances, computing device 10 may be executing malicious software that attempts to disguise itself as a spider. Rule analysis module 74 may analyze the device profile information and, based on whether anomalies are identified, differentiate between valid spiders and malicious software attempting to disguise itself as a valid spider (e.g., by changing characteristics of the software application executing at computing device 10). In other words, rule analysis module 74 and classifier module 80 may determine, based on a combination of the HTTP and browser characteristics included in the device profile information, which requests come from real search spiders versus camouflaged hackers or scripts.

By applying the rules, rule analysis module 74 may generate a maliciousness rating for a device. The maliciousness rating may be any value that changes based on an increased or decreased likelihood that the device is a malicious device. For purposes of clarity, a numerical maliciousness rating is discuss, but it should be understood that other types of maliciousness values are contemplated and that the maliciousness rating should not be limited to a numerical value.

In some examples, each different data point may be weighted differently based on the likelihood that a particular data point indicates that the device is a malicious device. For example, because some browser plugins, such as proxies, anonymizers, and hypertext transfer protocol (HTTP) sniffers are more likely to be executing on malicious devices, the weighting applied to each plugin may increase as the number of such plugins detected at a single device increases. In other words, if computing device 10 has two such plugins installed, the weighting may be two, but if four such plugins are installed at computing device 10, the weighting may be ten.

While described as applying rules to device profile information, rule analysis module 74 may also apply the rules to networks traffic patterns to increase or decrease the maliciousness rating for a particular device. For example, if a network traffic pattern for network traffic originating from computing device 10 corresponds to a pattern indicative of scanning security device 20 for vulnerabilities, rule analysis module 74 may increase the malicious rating for computing device 10. As another example, the network traffic pattern corresponds to a typical web session, rule analysis module 74 may decrease the malicious rating for computing device 10.

Rule analysis module 74 may pass the maliciousness rating to classifier module 80. Classifier module 80 determines whether the device associated with the maliciousness rating (e.g., computing device 10) is a malicious device. As one example, classifier module 80 may compare the generated maliciousness rating to a threshold maliciousness value. If the generated maliciousness rating satisfies the threshold maliciousness value, classifier module 80 classifies computing device 10 as a malicious device. If the generated maliciousness rating does not satisfy the threshold value, classifier module 80 does not classify computing device 10 as a malicious device.

Security service 16 may propagate the generated maliciousness rating and the classification for each device to other security devices. In general, security service server 24 maintains security device database 70. Security device database 70 includes information about security device that subscribe to the security service provided by security service 16 and security service server 24. Security device update module 78 may send device profile information to one or more security devices registered with security service 16 (e.g., security devices having entries within security device database 70). For example, security device update module 78 may send the device profile, maliciousness rating, malicious device categorization, etc. to other security devices.

While analytics module 66 is illustrated in the example of FIG. 3 as being included within security service server 24, in other examples, analytics module 66 and/or any combination of rule analysis module 74, rule update module 76, security device update module 78, and classifier module 80 may be included within security device 20 of FIGS. 1 and 2. In other words, security device 20 may be configured to perform any or all of the techniques describe with respect to security service server 24, including training rules, applying rules, generating maliciousness rating, classifying devices, and updating other security devices. Moreover, the particular distribution of functionality illustrated in FIGS. 1-3 and described with respect to FIGS. 1-3 is just one example of how the particular techniques of this disclosure may be distributed. Security device 20 and security service 16 may each perform more or less functionality attributed to each as described with respect to FIGS. 1-3.

Figure 4:
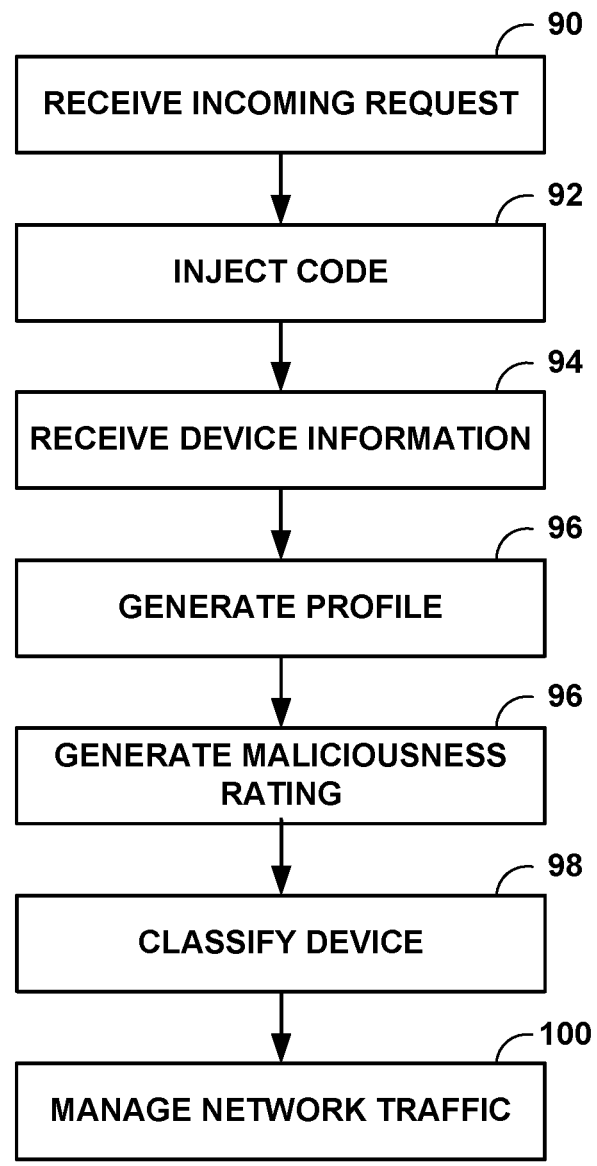
FIG. 4 is a flowchart illustrating an example process for identifying a malicious device, in accordance with one or more aspects of the present disclosure.

FIG. 4 is a flowchart illustrating an example process for identifying a malicious device, in accordance with one or more aspects of the present disclosure. For purposes of illustration only, the example operations are described below within the context of security device 20, as shown in FIGS. 1 and 2. Other example security devices may also perform the example operations described below.

Security device 20 receives an incoming request for data from a possible malicious device (e.g., computing device 10) (90). Packet parsing module 42 parses the request to extract information, such as User Agent information. Security device 20 may forward the incoming request to one of applications servers 22 that processes the request and sends a response. Security device 20 intercepts the response and code injection module 44 injects codes that causes computing device 10 to send additional data points (e.g., browser and/or device characteristics) and associated values to security device 20 (92). Computing device 10 receives the response and sends the data points and associated values to security device 20 without requiring a user of computing device 10 to perform any additional actions.

Security device 20 receives the device information (94) and profile generation module 46 generates a device profile for computing device 10 (96). Using the generated device profile, security module 40 generates a maliciousness rating for computing device 10 (98). For example, security module 40 may apply one or more rules to the device profile information to identify any inconsistencies or anomalies in the device profile information as well as to identify plugins installed at computing device 10 and, using this identified information, generating the maliciousness rating.

Security module 40 classifies computing device 10 as a malicious device or not as a malicious device (e.g., a benign device) based on the maliciousness rating (98). In some examples, security module 40 compares the generated maliciousness rating to a threshold value and classifies computing device 10 based on whether or not the maliciousness rating satisfies the threshold value.

Security device 20 manages the network traffic from computing device 10 based on the classification of computing device 10 (100). For example, if security module 40 classifies computing device 10 as a malicious device, security device 20 may actively manage all network traffic from computing device 10. For example, security device 20 may prevent the network traffic from reaching application servers 22. In some examples, security device 20 may block the network traffic, throttle the network traffic, redirect the network traffic, log the network traffic, or take other counter measures to minimize the impact of any potential attack originating from computing device 10. For example, security module 40 may intercept all packets sent by computing device 10 and provide fake responses in order to collect additional data points about computing device 10.

In some examples, security device 20 may determine that computing device 10 is a malicious device based on the network traffic generated by attacker device. For example, if computing device 10 is probing known security vulnerabilities of software executing at applications servers 22, security device 20 determines that computing device 10 is a malicious device and may manage network traffic originating from computing device 10 by, for example, blocking the network traffic, throttling network traffic, redirecting network traffic, logging the network traffic, or taking other counter measures to minimize the impact of any potential attack originating from computing device 10. If security device 20 determines that computing device 10 is not a malicious device, security device 20 may allow network traffic to be freely exchanged between computing device 10 and applications servers 22.

Figure 5:
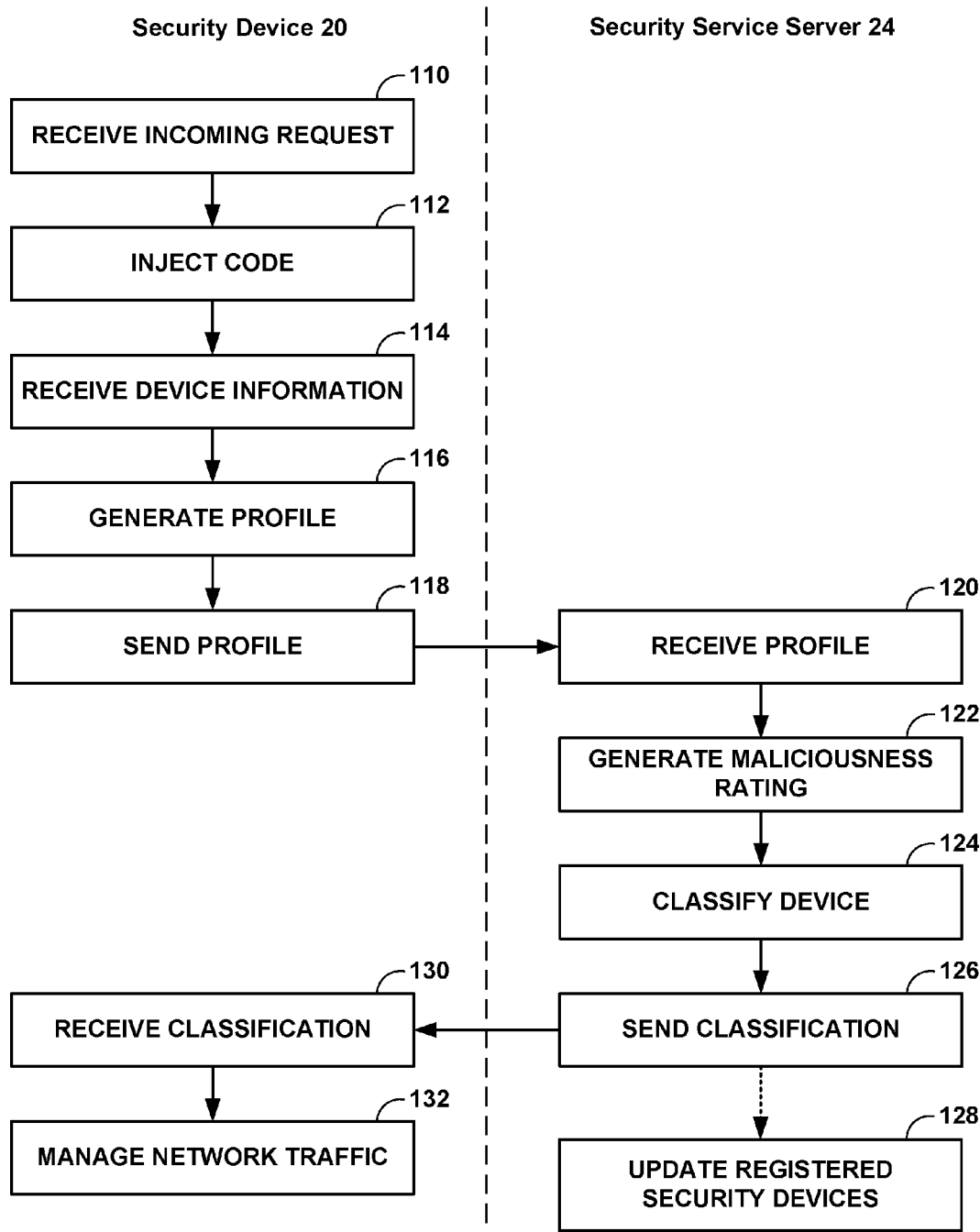
FIG. 5 is a flowchart illustrating another example process for identifying a malicious device, in accordance with one or more aspects of the present disclosure.

FIG. 5 is a flowchart illustrating another example process for identifying a malicious device, in accordance with one or more aspects of the present disclosure. For purposes of illustration only, the example operations are described below within the context of security device 20 and security service server 24, as shown in FIGS. 1-3. Other example security devices and security service servers may also perform the example operations described below.

Security device 20 receives an incoming request for data from a possible malicious device (e.g., computing device 10) (110). Packet parsing module 42 parses the request to extract information, such as User Agent information. Security device 20 may forward the incoming request to one of applications servers 22 that processes the request and sends a response. Security device 20 intercepts the response and code injection module 44 injects codes that causes computing device 10 to send additional data points (e.g., browser and/or device characteristics) and associated values to security device 20 (112). Computing device 10 receives the response and sends the data points and associated values to security device 20 without requiring a user of computing device 10 to perform any additional actions.

Security device 20 receives the device information (114) and profile generation module 46 generates a device profile for computing device 10 (116). Security device 20 sends the generated profile to security service servers 24 (118). Security service servers 24 receive the device profile information (120). Using the device profile information, rule analysis module 74 generates a maliciousness rating for computing device 10 (122). For example, rule analysis module 74 may apply one or more rules of rule database 68 to the device profile information to identify any inconsistencies or anomalies in the device profile information as well as to identify plugins installed at computing device 10 and, using this identified information, generating the maliciousness rating.

Classifier module 80 classifies computing device 10 as a malicious device or not as a malicious device (e.g., a benign device) based on the maliciousness rating (124). In some examples, classifier module 80 compares the generated maliciousness rating to a threshold value and classifies computing device 10 based on whether or not the maliciousness rating satisfies the threshold value. Security service server 24 sends the device classification information to security device 20 (126). Concurrently, at a scheduled time, or at some other time, security device update module 78 sends updated device profile and classification information to the security devices registered with security service 16 (e.g., based on information stored in security device database 70) (128).

Security device 20 receives the classification information from security service server 24 (130) and manages the network traffic from computing device 10 based on the classification of computing device 10 (132). For example, if the received classification information indicates that computing device 10 is a malicious device, security device 20 may actively manage all network traffic from computing device 10. If the received classification information indicates that computing device 10 is not a malicious device, security device 20 may allow network traffic to be freely exchanged between computing device 10 and applications servers 22.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the have been described. These and other embodiments are within the scope of the following claims.

What is claimed is:

1. A method comprising:
   receiving, by a security device, from a device, network traffic directed to one or more computing devices protected by the security device;
   determining, based on content of the network traffic, a first set of data points for the device, the first set of data points specifying characteristics of a software application executing at the device;
   sending, by the security device, a response to the device to ascertain a second set of data points for the device, the second set of data points including characteristics of an operating environment provided by and local to the device;
   receiving, by the security device and from the device, at least a portion of the second set of data points;
   determining whether the received portion of the second set of data points and the first set of data points include inconsistent information; and
   selectively managing, based on whether the received portion of the second set of data points and the first set of data points include inconsistent information, additional network traffic directed to the one or more computing devices protected by the security device and received from the device.

2. The method of claim 1, further comprising:
   receiving a response to the network traffic from at least one of the one or more computing devices; and
   prior to sending the response to the device, injecting, into the response, code to ascertain the second set of data points.

3. The method of claim 1, wherein determining whether the received portion of the second set of data points and the first set of data points include inconsistent information comprises:
   comparing at least one of the first set of data points of the device to at least one of the received portion of the second set of data points.

4. The method of claim 1, wherein selectively managing the additional network traffic comprises:
   generating, based on the received portion of the second set of data points and the first set of data points, a profile for the device;
   sending, to a security service, the profile of the device;
   receiving, from the security service, an indication of whether the device is a malicious device; and
   selectively managing, based on the indication, the additional network traffic directed to the one or more computing devices protected by the security device and received from the device.

5. The method of claim 1, further comprising:
   determining, based on whether the received portion of the second set of data points and the first set of data points include inconsistent information, a maliciousness rating for the device;
   determining, based on the received portion of the second set of data points, whether at least one plugin installed at the device is a malicious plugin;
   responsive to determining that at least one plugin is a malicious plugin, adjusting the maliciousness rating to correspond to an increased likelihood that the device is malicious; and
   responsive to determining that at least one plugin is not the malicious plugin, adjusting the maliciousness rating to correspond to a decreased likelihood that the device is malicious.

6. The method of claim 1, further comprising:
   determining, based on whether the received portion of the second set of data points and the first set of data points include inconsistent information, a maliciousness rating for the device; and
   responsive to determining, based on the received portion of the second set of data points, that a whitelisted plugin is installed at the device, adjusting the maliciousness rating to correspond to a decreased likelihood that the device is malicious.

7. The method of claim 1, further comprising:
   determining, based on whether the received portion of the second set of data points and the first set of data points include inconsistent information, a maliciousness rating for the device;
   determining, based on the received portion of the second set of data points and the first set of data points, that the device is executing a web crawler software application; and
   adjusting, based on the determination, the maliciousness rating to correspond to a decreased likelihood that the device is malicious.

8. The method of claim 1, wherein selectively managing, based on whether the received portion of the second set of data points and the first set of data points include inconsistent information, the additional network traffic directed to the one or more computing devices protected by the security device and received from the device comprises:
   responsive to determining that the received portion of the second set of data points and the first set of data points do not include inconsistent information, permitting the additional network traffic from the device to reach the one or more computing devices protected by the security device; and
   responsive to determining that the received portion of the second set of data points and the first set of data points include inconsistent information, preventing the additional network traffic from reaching the one or more computing devices protected by the security device.

9. The method of claim 1, wherein selectively managing the additional network traffic comprises, responsive to determining that the received portion of the second set of data points and the first set of data points include inconsistent information, managing the additional network traffic by performing one or more of throttling the additional network traffic, removing one or more user input values from the additional network traffic, dropping the additional network traffic, and redirecting the additional network traffic to a different device.

10. The method of claim 1, further comprising:
determining, based on whether the received portion of the second set of data points and the first set of data points include inconsistent information, a maliciousness rating for the device;
responsive to determining that the maliciousness rating satisfies a threshold value, determining that the device is a malicious device;
preventing the network traffic from reaching the one or more computing devices protected by the security device; and
generating, with the security device, a response to the network traffic that includes requests for additional data points of the device.

11. A device comprising:
one or more processors;
one or more network interface cards to receive, from a remote device, network traffic directed to one or more computing devices protected by the remote device, determine, based on content of the network traffic, a first set of data points for the remote device, the first set of data points specifying characteristics of a software application executing at the remote device, send a response to the remote device to ascertain a second set of data points for the remote device, the second set of data points including characteristics of an operating environment provided by and local to the remote device, and receive, from the remote device, at least a portion of the second set of data points; and
a security module operable by the one or more processors to determine whether the received portion of the second set of data points and the first set of data points include inconsistent information, and selectively manage, based on whether the received portion of the second set of data points and the first set of data points include inconsistent information, additional network traffic directed to the one or more computing devices protected by the security device and received from the remote device.

12. The device of claim 11,
wherein the security module is operable by the one or more processors to receive a response to the network traffic from at least one of the one or more computing devices, and wherein the device further comprises:
a code injection module operable by the one or more processors to, prior to sending the response to the device, inject, into the response, code to ascertain the second set of data points.

13. The device of claim 11, further comprising:
a profile generation module operable by the one or more processors to generate, based on the received portion of the second set of data points and the first set of data points, a profile for the remote device; and
a data collection module operable by the one or more processors to send, to a security service, the profile of the remote device, and receive, from the security service, an indication of whether the remote device is a malicious device,
wherein the security module is operable by the one or more processors to selectively manage, based on the indication, the additional network traffic directed to the one or more computing devices protected by the security device and received from the remote device.

14. The device of claim 11, wherein the security module is operable by the one or more processors to determine, based on whether the received portion of the second set of data points and the first set of data points include inconsistent information, a maliciousness rating for the device, determine, based on the received portion of the second set of data points, whether at least one plugin installed at the remote device is a malicious plugin, responsive to determining that at least one plugin is a malicious plugin, adjusting the maliciousness rating to correspond to an increased likelihood that the remote device is malicious, and responsive to determining that at least one plugin is not the malicious plugin, adjusting the maliciousness rating to correspond to a decreased likelihood that the remote device is malicious.

15. The device of claim 11, wherein the security module is operable by the one or more processors to determine, based on whether the received portion of the second set of data points and the first set of data points include inconsistent information, a maliciousness rating for the device, and, responsive to determining, based on the received portion of the second set of data points, that a whitelisted plugin is installed at the remote device, adjusting the maliciousness rating to correspond to a decreased likelihood that the remote device is malicious.

16. The device of claim 11, wherein the security module is operable by the one or more processors to determine, based on whether the received portion of the second set of data points and the first set of data points include inconsistent information, a maliciousness rating for the device, determine, based on the received portion of the second set of data points and the first set of data points, that the remote device is executing a web crawler software application, and adjust, based on the determination, the maliciousness rating to correspond to a decreased likelihood that the remote device is malicious.

17. The device of claim 11, wherein the security module is operable by the one or more processors to, responsive to determining that the received portion of the second set of data points and the first set of data points do not include inconsistent information, permit the additional network traffic from the remote device to reach the one or more computing devices protected by the security device, and, responsive to determining that the the received portion of the second set of data points and the first set of data points include inconsistent information, prevent the additional network traffic from reaching the one or more computing devices protected by the security device.

18. A non-transitory computer-readable storage medium encoded with instructions for causing one or more processors of a security device to:
receive, from a device, network traffic directed to one or more computing devices protected by the security device;
determine, based on content of the network traffic, a first set of data points for the device, the first set of data points specifying characteristics of a software application executing at the device;
send a response to the device to ascertain a second set of data points for the device, the second set of data points including characteristics of an operating environment provided by and local to the device;
receive, from the device, at least a portion of the second set of data points;
determine whether the received portion of the second set of data points and the first set of data points include inconsistent information; and selectively manage, based on whether the received portion of the second set of data points and the first set of data points include inconsistent information, additional network traffic directed to the one or more computing devices protected by the security device and received from the device.

19. The non-transitory computer-readable storage medium of claim 18, further encoded with instructions for causing the one or more processors of the security device to:
receive a response to the network traffic from at least one of the one or more computing devices; and
prior to sending the response to the device, inject, into the response, code to ascertain the second set of data points.

20. The non-transitory computer-readable storage medium of claim 18, further encoded with instructions for causing the one or more processors of the security device to:
generate, based on the received portion of the second set of data points and the first set of data points, a profile for the remote device;
send, to a security service, the profile of the remote device;
receive, from the security service, an indication of whether the remote device is a malicious device; and
selectively manage, based on the indication, the additional network traffic directed to the one or more computing devices protected by the security device and received from the remote device.

* * * * *